United States Patent
Froger et al.

(10) Patent No.: US 6,247,363 B1
(45) Date of Patent: Jun. 19, 2001

(54) METHOD AND DEVICE FOR DETERMINING A QUANTITY OF CONSUMABLE PRODUCT PRESENT IN A RESERVOIR AND A DOCUMENT PRINTING DEVICE IMPLEMENTING THIS METHOD

(75) Inventors: Marie- Hélàne Froger, Chateaugiron; Pascal Coudray, La Chapelle des Fougeretz, both of (FR)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/046,432

(22) Filed: Mar. 24, 1998

(30) Foreign Application Priority Data

Mar. 28, 1997 (FR) .................................................. 97 03862

(51) Int. Cl.$^7$ ........................... G01F 23/00; G01R 27/26; H01G 5/012; H01G 5/00

(52) U.S. Cl. .................... 73/304 C; 73/290 R; 324/658; 324/660; 324/661; 324/662; 324/663; 361/284; 361/289; 361/290

(58) Field of Search .............................. 73/290 R, 304 C; 361/284, 289, 290; 324/658, 660, 661, 662, 663

(56) References Cited

U.S. PATENT DOCUMENTS

| | | | |
|---|---|---|---|
| 4,386,312 | * 5/1983 | Briefer | 324/661 |
| 4,942,351 | 7/1990 | Kronau | 318/642 |
| 4,942,357 | * 7/1990 | Chang | 324/158 |
| 4,961,055 | * 10/1990 | Habib et al. | 324/662 |
| 5,265,482 | * 11/1993 | Davis et al. | 73/863.01 |
| 5,896,032 | * 4/1999 | Yagi et al. | 324/660 |

FOREIGN PATENT DOCUMENTS 3344447  6/1984 (DE) .

* cited by examiner

Primary Examiner—Hezron Williams
Assistant Examiner—Dennis Loo
(74) Attorney, Agent, or Firm—Fitzpatrick, Cella, Harper & Scinto

(57) ABSTRACT

Determination of the quantity of consumable product present in a reservoir, for example the quantity of ink present in the reservoir of an inkjet printing device.

According to the invention, the movable reservoir can be engaged in the dielectric space of a capacitor consisting of two plates, a signal generator applies a signal to the capacitor and the reservoir is moved, a comparator changes state when a threshold is reached and the distance travelled by the reservoir makes it possible to determine the quantity of product situated therein.

18 Claims, 6 Drawing Sheets

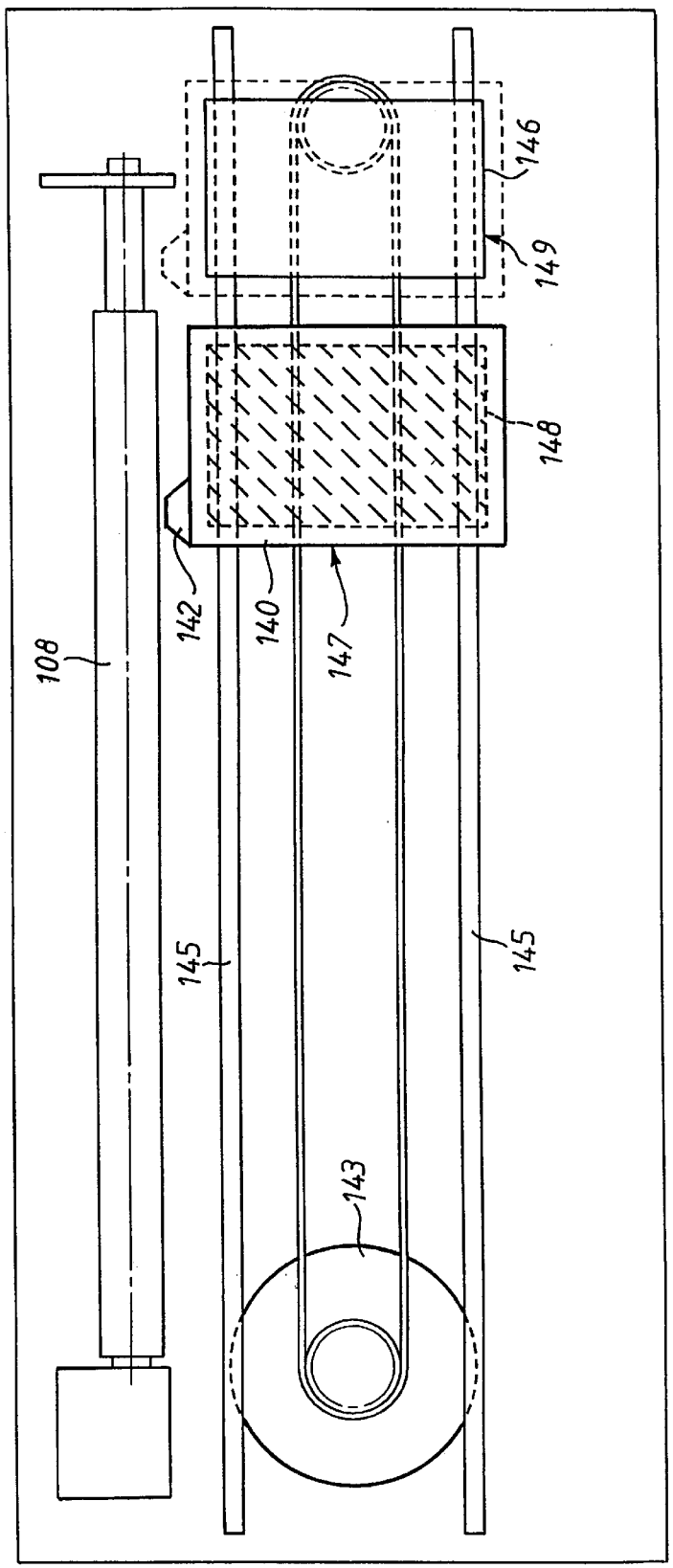

METHOD AND DEVICE FOR DETERMINING A QUANTITY OF CONSUMABLE PRODUCT PRESENT IN A RESERVOIR AND A DOCUMENT PRINTING DEVICE IMPLEMENTING THIS METHOD

The invention relates to a method for determining a quantity of consumable product present in a reservoir forming part of a movable appliance able to move along a predetermined path.

The invention also concerns a device for measuring a quantity of consumable product present in a reservoir forming part of such a moving appliance and, by way of application, an inkjet document printing device of the type having a removable and/or exchangeable movable appliance comprising at least one ink reservoir and provided with a measuring device in question.

Several principles used notably in printing devices using inkjet technology are known, for measuring the level of ink in a reservoir or at least for detecting a minimum level making it possible to indicate to the user the need to fill a reservoir or most often to change a cartridge containing such a reservoir.

For example, U.S. Pat. No. 4,700,754 describes a method for detecting the presence of a quantity of ink in a flexible reservoir contracting as the ink is consumed. The bottom wall of this reservoir is coated with a conductive layer constituting the electrode or plate of a capacitor. The wall of the reservoir serves as a dielectric and the ink constitutes the second plate of the capacitor. It must be conductive and an electrode is immersed therein in order to connect the ink to the measuring device. When the quantity of ink falls, the ink surface opposite the conductive layer coated on the external wall of the reservoir decreases and consequently the value of the equivalent capacitance also decreases. This principle has a certain number of failings. In the first place, the reservoir must have flexible walls since galvanic contact between the measuring circuit and the ink can be effected only if the top wall (by collapsing) forces the electrode to remain in contact with the ink. The measuring arrangement, requiring an electrode in contact with the ink in the reservoir, is relatively complex. It is also difficult to know the level of ink when this is less than the distance separating the contact electrode from the bottom wall. In addition, it is necessary to change the frequency of the measuring signal continually in order to evaluate the ink level, which requires the use of complex and expensive electronic systems.

In addition, the document EP 0 028 399 describes a method for detecting the minimum level of ink in a reservoir, using an oscillating circuit whose capacitor is formed by two metal plates between which is situated the ink reservoir. The latter therefore fills the dielectric space of the said capacitor and the quantity of ink has a direct influence on the permittivity of the said dielectric space and therefore the value of the capacitance. The oscillating circuit is calibrated so that its resonant frequency and therefore the maximum voltage at its measuring resistor is achieved when the ink level reaches a predetermined low value. When the resonance is reached, a signal which can be used for indicating is sent. Consequently, with such a system, the only information available is an indication that the ink level is or is not above a predetermined low threshold. If it is wished to obtain more precise information relating to the quantity of ink present in the reservoir, it would be necessary to increase the number of reference values using, for example, an analogue to digital converter. Such a solution is very expensive.

The invention concerns a type of measurement as described above in which the quantity of ink contained in a reservoir is situated, at least during the measuring time, in the dielectric space of a capacitor in order to affect the permittivity thereof.

The invention relates to a simple measuring system operating at a fixed frequency and not requiring the use of an analogue to digital converter.

The invention preferably aims to indicate a measurement of the quantity of ink remaining in the reservoir and not only to indicate that a predetermined value, constituting a low level, has been reached.

The invention relates to a device for measuring an ink level in a printing device comprising an exchangeable cartridge enclosing an ink reservoir, the arrangement requiring no or practically no modification to the cartridge.

The invention relates to a concept which can be used for any type of ink cartridge, with a flexible or rigid reservoir.

The basic idea of the invention involves establishing a biunique relationship between the quantity of ink present in a reservoir engaged in the dielectric space of he capacitor and a distance travelled by this reservoir secured to an appliance which is able to move between two positions, so that a signal transmitted by the said capacitor reaches a predetermined level.

According to the invention, a capacitor is formed through which a signal is caused to pass, the reservoir containing the ink being placed in the dielectric space of this capacitor, and this dielectric space is modified by moving at least the reservoir, or even one of the plates of the capacitor with it in order to vary the value of the capacitance, and consequently modify the value of the signal transmitted by this capacitor. According to the position of the reservoir when a predetermined threshold is reached, a distance of movement of the reservoir is determined which represents the quantity of product which it contains.

In other words, the invention therefore concerns a method for determining a quantity of consumable product present in a reservoir forming part of a movable appliance able to move along a predetermined path, which comprises the steps of:

forming a capacitor from two conductive plates situated along the said path so that the said path passes through the dielectric space of the said capacitor, applying a signal to the said capacitor and measuring a resulting signal depending on the value of the capacitance of the capacitor, moving the said reservoir along a portion of the said path passing through the said dielectric space, determining the distance travelled by the said reservoir between two positions, a variable position through which the said resulting signal passes through a predetermined threshold value and a fixed position, and deducing the said quantity of product present in the reservoir as a function of the said distance.

According to a preferred variant, the method includes placing the said reservoir in a predetermined starting position in which it is situated in the said dielectric space and then moving it in a direction suitable for reducing the value of the capacitance of the capacitor until the resulting signal reaches the predetermined threshold value and measuring the distance through which the reservoir has been moved at the moment the threshold value is reached in order to deduce therefrom the said quantity of product.

The invention also concerns a device for determining the quantity of consumable product present in a reservoir forming part of the movable appliance made to move along a guide means under the action of a drive means, that has:

a capacitor formed by two conductive plates installed along the guide means so that the reservoir can engage in the dielectric space of this capacitor, signal generation means connected so as to apply this signal to the capacitor, receiving means for picking up a resulting signal transmitted by the capacitor in response to the signal, comparative means for comparing the resulting signal with a predetermined threshold value, these comparative means producing an output signal when the resulting signal reaches the threshold value, means for measuring the movement of the movable appliance and means for establishing an item of information representing the quantity of consumable product as a function of a distance travelled by the movable appliance between two positions, a predetermined position and a position in which the threshold value is reached.

Preferably, the movable appliance is moved by a stepping electric motor. In this case, the distance travelled by the reservoir is determined by counting the number of steps of the motor during the travel of the movable appliance between the predetermined position and the position in which the resulting signal reaches the predetermined threshold value, or vice versa.

The capacitor can consist of two fixed conductive plates and, in this case, the reservoir is introduced into the dielectric space in order to place it in a predetermined position in which the capacitance of the capacitor is substantially at its maximum. Then the reservoir is removed from this dielectric space until the resulting signal reaches the predetermined threshold value.

One of the plates of the capacitor can be fixed to a wall of the reservoir. This arrangement can be adopted when a conductor lead is connected to the movable appliance, so that this does not enter the dielectric space during the movement of the movable appliance where it could constitute a screen liable to falsify the measurement. In this case, if the two plates are parallel to the direction of movement of the reservoir, the reduction in capacitance thereof is due to the reduction of the facing parts of the plates and the corresponding modification of the dielectric space. The variation in capacitance therefore depends notably on the initial permittivity, which itself depends on the quantity of ink present in the reservoir. The two plates can also be arranged perpendicularly to the direction of movement of the reservoir and, in this case, one of the plates moves with the reservoir, so that the distance between the two plates increases. There again, the variation in capacitance depends on the initial permittivity and consequently on the quantity of ink present in the reservoir between the two plates.

By way of application, the invention also concerns an inkjet document printing device, of the type having a movable appliance comprising an ink reservoir, the movable appliance being made to move along a guide means arranged opposite a mechanism for moving a printing medium, the movable appliance being coupled to a drive motor, that includes:

a capacitor consisting of two conductive plates installed along the guide means so that the reservoir can engage in the dielectric space of this capacitor, signal generation means connected so as to apply this signal to the capacitor, receiving means for picking up a resulting signal transmitted by the capacitor in response to the signal, comparison means for comparing the resulting signal with a predetermined threshold value, these comparison means producing an output signal when the resulting signal reaches the threshold value, means for measuring the movement of the movable appliance and means for producing an item of information representing the quantity of consumable product as a function of a distance travelled by the movable appliance between two positions, a predetermined position and a position in which the threshold value is reached.

Naturally the invention also concerns an ink recharging cartridge for an inkjet document printing device able to be used in the context of a method defined above and which has a reservoir and in that a conductive surface forming a capacitor plate is carried by one face of this reservoir.

The invention also concerns any office machine equipped with a device as defined above. Such an office machine can for example constitute essentially a facsimile machine or a printer.

The invention also applies to a microcomputer characterised in that it has at least one device as defined above.

The invention will be better understood and other advantages thereof will emerge more clearly in the light of the description which follows, given solely by way of example and made with reference to the accompanying drawings in which:

FIG. 3 is a partial diagrammatic view of the facsimile machine seen in the direction of the arrow III in FIG. 1 and showing particularly the main elements of the printing device;

Figure 1:
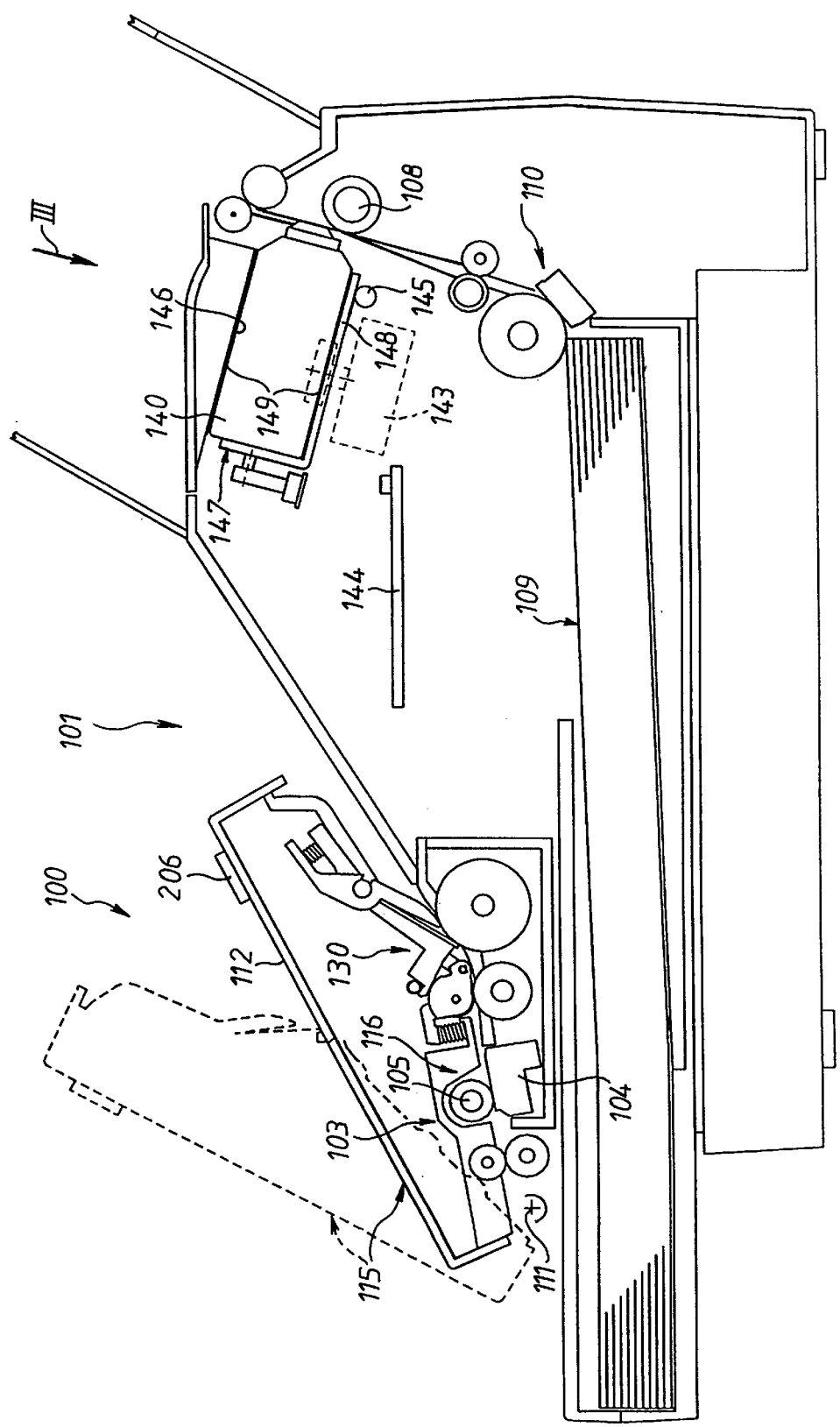
FIG. 1 is a diagrammatic view of a facsimile machine comprising a document printing device implementing the invention.

Considering particularly FIG. 1, the essential elements of a facsimile machine 100 of known general architecture have been depicted. It includes, in a conventional fashion:

a temporary storage area 101 able to receive documents to be transmitted; this area has notably a plate 102 on which the documents are stacked, reading means 103 including essentially a sensor 104 and a pressing roller 105, each document to be transmitted being made to pass between the pressing roller and the sensor in order to be analysed.

a paper storage tray 109 arranged upstream of a paper-conveying device 110 designed to convey sheets of paper, taken one by one from the tray, to a printing device 150 which will be described later, and an automatic feed device 130 designed to take the sheets one by one from the support plate 102 and transfer them in succession to the reading means 103.

In this type of facsimile machine, part of the reading means (notably the roller 105) and part of the feed means 130 are installed in a cover 115 pivoting about a horizontal axis 111. A control panel 112 giving access to the different functions of the facsimile machine is arranged on the top of this cover. It has notably a function display 206.

In FIG. 1, the cover 115 is illustrated in solid lines in its closed position in which the facsimile machine is operational. It is illustrated in broken lines in its open position in which the user has access to certain mechanisms and can intervene in the event of abnormal operation, for example if a document is not properly engaged. The cover 115 has a frame 116, pivoting with it, carrying certain components of the reading means 103 and of the feed device 130.

Other components, notably the sensor 104, are mounted in the fixed casing of the facsimile machine.

The arrangement is conventional overall and will therefore not be described in any more detail. Such a facsimile machine is described in patent application EP 0 588 616 in the name of CANON INC.

The facsimile machine also has, as mentioned above, a device 150 for printing the documents received. This is an inkjet printing device.

In FIG. 1, there can be seen:
an exchangeable cartridge 141, having notably a printing head 142 and an ink reservoir 140, the ink here being the consumable product mentioned above;
a drive motor 143 driving a movable appliance 147 incorporating the cartridge 141;
a guidance and pressing roller 108 designed to cooperate with other guide means in order to move the paper sheets opposite the path of the printing head.

A printed circuit 144 can also be seen, on which the electronic components controlling the printing device 150 are installed and wired up.

Referring more particularly to FIG. 3, which depicts the printing device seen from above, the movable equipment 147, carrying essentially the reservoir 140 and the inkjet printing head 142, can be seen better. The latter moves opposite the guide roller 108. The length of the roller represents substantially the width of the paper which can be admitted into the printer. It can therefore be seen that the movable appliance moves along a rectilinear path longer than the length of the roller and can therefore adopt several predetermined waiting positions, on each side of this roller. The movable appliance moves along two rectilinear guides 145 parallel to the roller 108. The stepping motor 143 drives the movable appliance by means of a conventional belt and pulley system. A set of flexible conductors forming a braid or strand (not shown) is connected to the movable appliance 147, in order to control the printing head 142. This set of conductors is sufficiently flexible in order not to interfere with the movement of the movable appliance. It coils up and uncoils along the latter in order to accompany its movements.

According to an important characteristic of the invention, the printing device 150 which has just been described is supplemented so as to form a capacitor 149, at least over part of the path 145a (defined by the guides 145), of the movable appliance 147, from two conductive plates 146, 148 situated along the path and arranged so that the said path passes through the dielectric space 151 of the capacitor and so that the reservoir 140 can enter this dielectric space.

FIGS. 4A–4B, 5A–5B and 6A–6B show different ways of producing this capacitor in combination with the movable appliance and the reservoir.

Figure 4A:
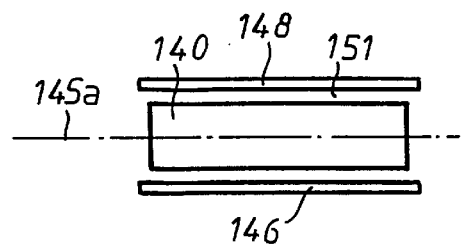
FIGS. 4A and 4B illustrate the principle of implementation of the invention according to a first embodiment.
Figure 4B:
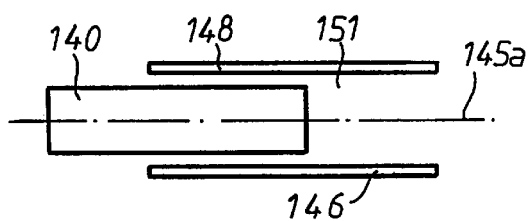

For example, in FIGS. 4A–4B, the two conductive plates 146, 148 are fixed and arranged parallel to the direction of movement of the reservoir or path 145a. They are separated by a sufficient distance for the reservoir 140 to be able to enter the dielectric space 151. The two plates 146, 148 can for example be metal plates placed opposite each other at one end of the path of the movable appliance. Under these conditions, the reservoir 140 containing a certain quantity of ink can be engaged in the dielectric space and modify the permittivity of the capacitor 149 as a function of the quantity of ink present in the reservoir. The dimensions of the two plates are close to those of two opposite faces of the reservoir 140, so that, for a predetermined position (FIG. 4A), practically all the reservoir is situated in the dielectric space 151. However, under the control of the motor 143, the movable appliance can move so that the reservoir 140 moves progressive out of the dielectric space (FIG. 4B). The consequence of this movement is to reduce the capacitance of the capacitor.

Figure 5A:
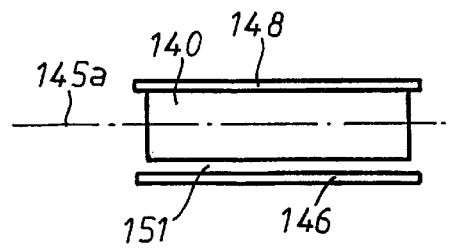
FIGS. 5A and 5B illustrate the principle of implementation of the invention according to a first variant.
Figure 5B:
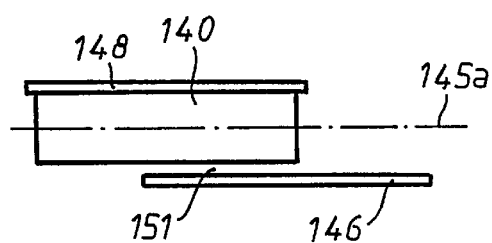

FIGS. 5A–5B depict another way of arranging the capacitor 149. The latter consists of a fixed plate 146 as in the previous embodiment, but the other plate 148 is fixed to a wall of the reservoir and is therefore movable. It can be metallised onto this wall. Naturally the wall of the reservoir provided with this movable conductive is plate 148 is not the wall closest to the fixed plate, but the other parallel wall further away, so that, when the movable appliance is in a predetermined position in which the two plates are completely opposite each other (FIG. 5A), the capacitance of the capacitor 149 is at its maximum and the reservoir 140 entirely contained in the dielectric space 151 thus defined.

In this example, the two plates are arranged parallel to the direction of movement of the reservoir, that is to say the path 145a.

Consequently, when the movable appliance moves under the control of the stepping motor 143, the result is both a reduction in the surfaces of the two plates 146, 148 in correspondence, and a reduction in the quantity of ink present in the dielectric space 151. The variation in these two factors gives rise to a progressive reduction in the capacitance of the capacitor 149, and the decrease of this capacitance as a function of the distance travelled by the movable plate 148 represents the quantity of ink contained in the reservoir 140.

Figure 6A:
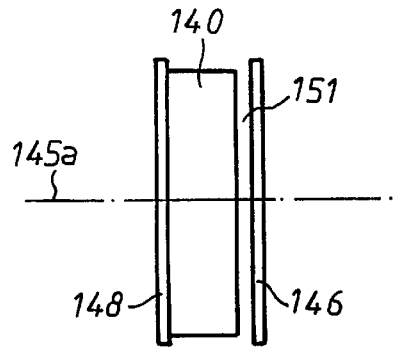
FIGS. 6A and 6B illustrate the principle of implementation of the invention according to a second variant.
Figure 6B:
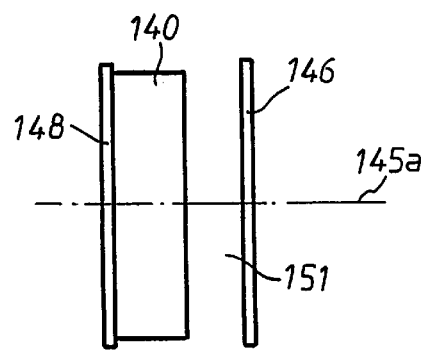

FIGS. 6A–6B illustrate a third way of producing the capacitor 149, consisting of disposing plates 146, 148 perpendicularly to the direction of movement of the reservoir, that is to say the path 145a. More precisely, the fixed plate is placed at one end of the path of the movable appliance and, as in the previous example, the movable plate 148 is fixed to or metallised on one face of the reservoir perpendicular to the direction of movement. Naturally, this is not the face of the reservoir which arrives closest to the fixed plate when the movable appliance reaches the said predetermined position (FIG. 6A), but the opposite face so that, as previously, all the reservoir 140 is situated in the dielectric space 151 and the capacitance of the capacitor 149 is at its maximum when the movable appliance is in the said predetermined position.

In this embodiment, the reservoir 140 is always completely in the dielectric space 151 even when the movable appliance is moved away from the predetermined position in which the capacitance is at its maximum. It is the distance between the plates 146, 148 and therefore the dimensions of the dielectric space which increase (see FIG. 6B). The result is a reduction in the capacitance, and the decrease of this capacitance as a function of the distance travelled by the movable appliance from the said predetermined position represents the quantity of ink present in the reservoir.

The ink being the aforementioned consumable product affecting the permittivity, its progressive decrease in the reservoir will have an influence on the way in which the capacitance decreases as the reservoir 140 is moved away from the said predetermined position in which the capacitance is at its maximum. In other words, if a minimum capacitance is defined as a reference, there is a relationship between the quantity of ink present in the reservoir and the distance travelled by the movable appliance 147 at the moment when the capacitance reaches the minimum reference value chosen. It is this concept which is used in the context of the method according to the invention.

This is because, according to this method, a high-frequency alternating signal is applied to the capacitor 149 thus formed when the movable appliance is situated in the said predetermined position in which the capacitance is at its maximum and in which the reservoir is situated entirely in the dielectric space. The resulting signal depending on the value of the capacitance of the capacitor is measured. The reservoir 140 (in fact the movable appliance) is moved in a direction able to cause the capacitance of the capacitor to decrease, and the resulting alternating signal is measured (that is to say its decay is "monitored") until it reaches a predetermined threshold value corresponding to a minimum capacitance chosen. A measurement is then made of the distance through which the reservoir 140 has moved at the moment when the threshold value is reached. This measurement is effected very simply by counting the number of steps through which the motor 143 has turned during this movement.

Figure 2:
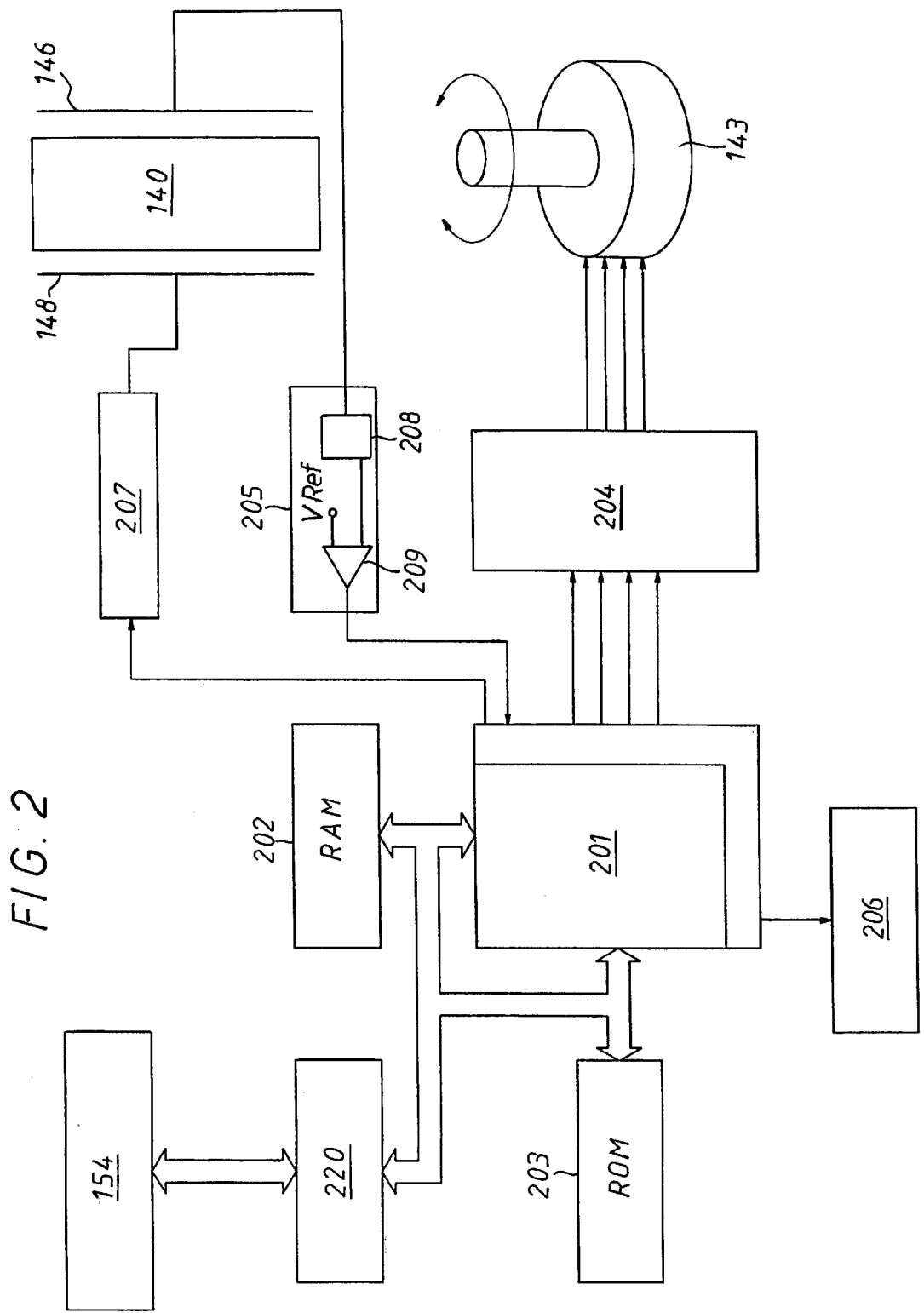
FIG. 2 is a block diagram illustrating the electronic circuit controlling the movable appliance driven by a stepping motor used in accordance with the principle of the invention.

FIG. 2 illustrates the block diagram of the electronic control circuit of the facsimile machine incorporating the specific means for implementing the invention. There can be seen therein notably an oscillator 207 which applies a high-frequency electrical signal (20 MHz for example) to a resistance/capacitance circuit, the capacitance being none other than the capacitor 149 formed by the plates 146 and 148.

In the example described, the output of the oscillator is connected to the movable plate 148. The resistance is the input impedance of the signal reception means consisting of a comparator 205. This comparator is of a very simple analogue type.

It can for example consist of a differential amplifier 209 and an envelope detector 208.

The input of the latter is connected to the capacitor 149, more precisely here the fixed plate 146. The output of the envelope detector 208 is connected to an input of the amplifier 209, left in open loop. The other input of this amplifier is connected to a reference voltage VRef. The output of the amplifier constitutes the output of the said comparator 205.

Because of the very high gain of the amplifier, its output is in one or other of two possible saturated states as a function of the direction of the difference in voltage present at its two inputs.

Naturally the reference voltage VRef applied to the second input of the amplifier 209 corresponds to the aforementioned predetermined threshold value and represents a predetermined minimum capacitance of the capacitor. The changing state of the comparator occurs when the motor 143 which drives the movable appliance and consequently the reservoir 140 has moved the latter away by a certain distance from the predetermined position in which the capacitance is at its maximum. This distance, measured in the number of steps of the motor 143 is variable and depends on the quantity of ink present in the reservoir.

The electronic circuit of FIG. 2 also includes:
 a logic facsimile means 154 designed to decode the information transmission signals transmitted by telephone channels, a printer microprocessor 201, a random access memory RAM 202 in which are recorded the variables and the temporary values necessary for the operation of the device,
 a read only memory ROM 203 in which the programs run by the microprocessor 201 are recorded.

Figure 8:
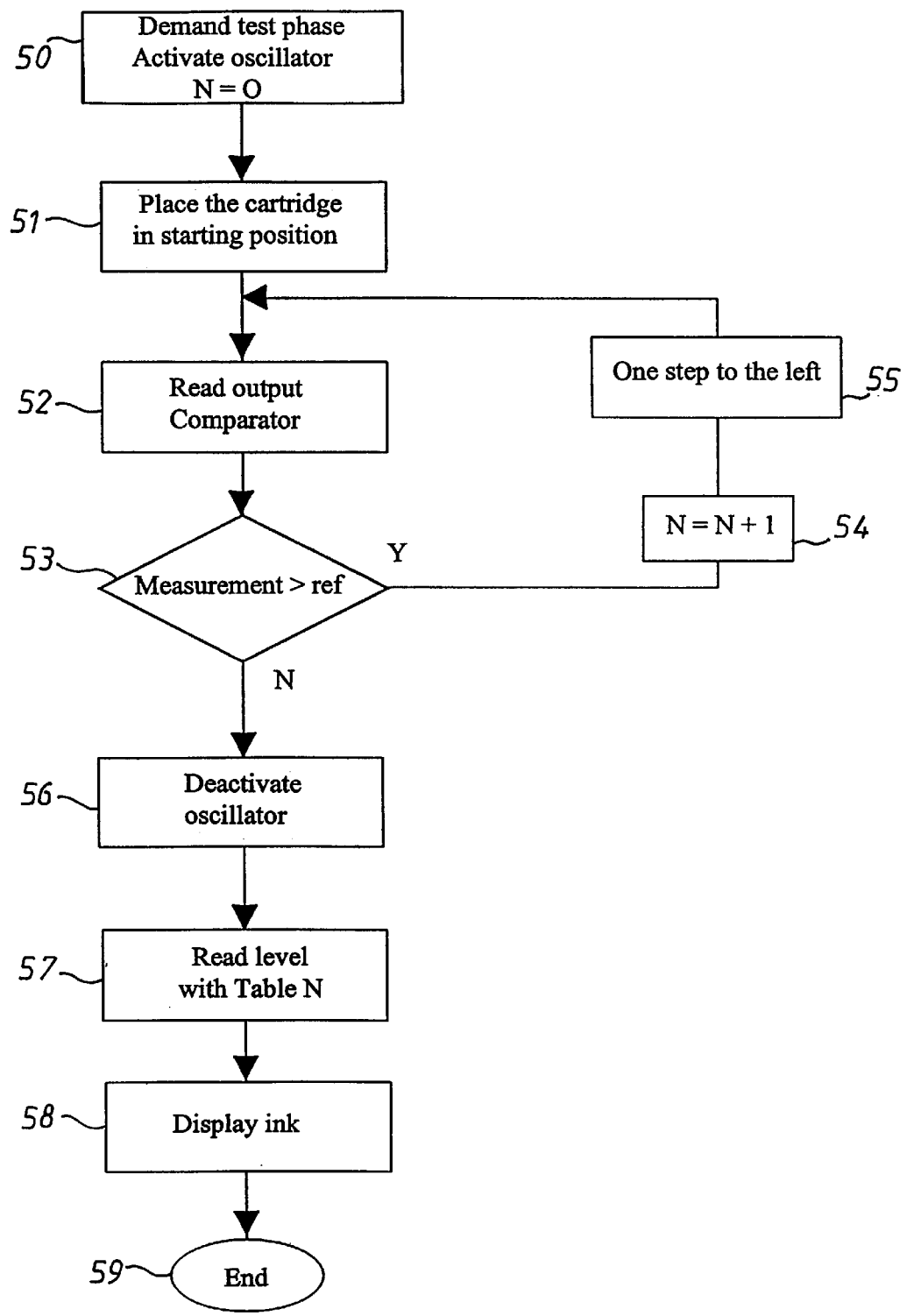
FIG. 8 is a flow diagram for a program registered in a read only memory of the circuit of FIG. 2 for implementing the invention.

In particular, the read only memory 203 has a test program which will be described with reference to FIG. 8 and which constitutes an example implementation of the method according to the invention. The device also has a power circuit 204. This power circuit receives four low-level control logic signals coming from the microprocessor 201. It amplifies them in order to apply them at low power to the four inputs of the winding of the stepping motor 143. The display 206 is controlled by the microprocessor. The microprocessor, the read only memory and the random access memory communicate by means of a connection BUS with an interface circuit 220 providing the coupling with the logic means of the facsimile machine 154. Apart from the specific circuit comprising the oscillator 207, the capacitor consisting of the two plates 146 and 148 and the comparator 205, the circuits which have just been described briefly are conventional and well known to persons skilled in the art. Returning to FIG. 3, it can be seen that the capacitor 149 is produced at one end of the path of the movable appliance 147 and that the plate 148 is fixed to the wall of the reservoir. The two plates are therefore in the form of rectangular plates parallel to the path of the movable appliance, which corresponds to the embodiment illustrated schematically by FIGS. 5A–5B.

The movable appliance or more specifically the cartridge 141 comprising the reservoir 140 and the printing head 142 have been depicted in dotted lines in an end-of-travel position corresponding to a movement of 0 steps of the motor 143. In this position, the plates 146 and 148 are completely facing each other and the capacitance of the capacitor 149 is at its maximum. The same figure depicts in solid lines the same movable appliance in another position in which the plate 148 is no longer opposite the plate 146, which corresponds to a movement of approximately 50 steps. The position of the movable appliance is still known with precision, since it corresponds biuniquely to a number of steps effected by the motor 143 from, for example, the predetermined position in which the capacitance is at its maximum. Between these two predetermined positions, the signal of the oscillator transmitted by the capacitor decreases at the input to the comparator 205 until the output of the comparator switches and applies an item of information to an input of the microprocessor 201. It can therefore be seen that the circuit according to the invention saves on any expensive analogue to digital converter.

Figure 7:
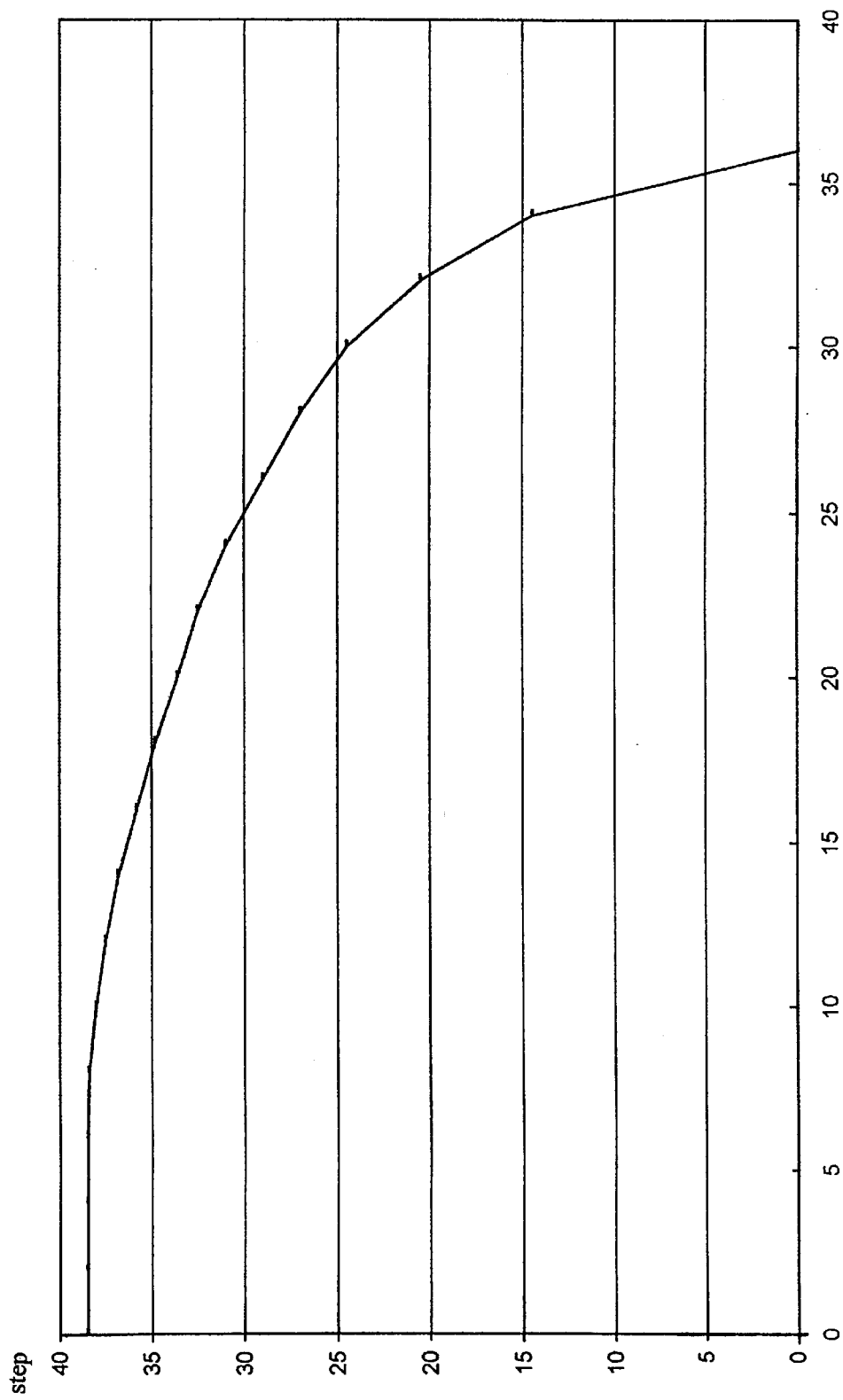
FIG. 7 is a graph showing an example of a relationship established between the quantity of ink present in the reservoir and the movement of the movable appliance.

FIG. 7 is a graph illustrating the correlation between the quantity of ink present in the reservoir 140 and the number of steps effected by the motor 143 so that the output of the comparator changes state. The number of black pages which are being printed from a full reservoir have been entered on the x-axis. It can therefore be seen that, when no page is printed (full reservoir) the motor must move the movable appliance by 38 steps for the comparator to change state. On the other hand, the more pages that have been printed, that is to say the more the reservoir empties, the more the distance shortens through which it is necessary to move the movable appliance in order to obtain the change of state. The information in number of steps is therefore the given which is taken into account by the microprocessor in order to calculate the quantity of ink present in the reservoir at the time of the test. Concretely, the graph in FIG. 4 is entered in the read only memory 203.

A description will now be given, with reference to FIG. 8, of the operation of the device and the implementation of the method according to the invention. In general terms, the printing device illustrated functions in a conventional and known fashion, for example as described in the patent EP 0 588 616. Likewise the facsimile machine functions in a conventional fashion. There is therefore no need to describe any of these operating modes in detail here.

However, the control programs recorded in the read only memory 203 are modified in order to include a program for testing the quantity of ink present in the reservoir which is used periodically. Such a test is performed as follows.

A test phase is initiated at the end of the printing of each page (operation 50). This step consists of setting a variable N to zero, N representing the number of steps effected, and activating the oscillator 207. The step 51 consists of placing the cartridge, or more exactly the movable appliance, at the end of the path as depicted in broken lines in FIG. 3, which has the effect of placing the two plates 146, 148 face to face so as to present a maximum facing surface area. The following step 52 consists, for the microprocessor, of reading the output state of the comparator. The microprocessor will then test the state. If the output level of the comparator is high, for example, which represents a measurement greater than the reference level, the microprocessor actuates the motor by one step in order to move the movable appliance to the left as seen in FIG. 3. This is effected at step 55. At the same time, N is incremented by one unit at step 54. The reading of the output of the comparator is recommenced at 52 and the test 53 is repeated. As soon as the test 53 is negative, the microprocessor deactivates the oscillator 207 at step 56 and controls (step 58) the reading the of the table entered in the read only memory 203 and corresponding to FIG. 4, according to the value of the number N, which represents the number of steps effected by the motor in order to obtain the change of state of the comparator 205. At step 58, the microprocessor controls the display of the quantity of ink remaining in the reservoir, for example expressed as a percentage. If this quantity is sufficient, the test ends at 59 and a new page can be printed.

A certain number of variants are possible. Initially, a description was preferentially given of a method and device in which the reservoir is moved from the position in which the value of the capacitance is at its maximum to a position in which the resulting signal reaches the predetermined threshold value. However, the movement of the reservoir can take place in the opposite direction. It is possible to read the position of the reservoir in which the threshold value is reached, and then continue the movement of the reservoir inside the dielectric space until it reaches a predetermined position, preferably the position in which the capacitance of the reservoir is at its maximum. The number of steps recorded between these two positions represents the quantity of consumable product present in the reservoir at the time of the test.

As the method according to the invention is able to determine the quantity of product contained in the reservoir at the time of a test, it is possible, by this means, to monitor the filling of the reservoir. It suffices to perform several successive tests making it possible each time to display the quantity present in the reservoir and to check, for example, that its filling is taking place or has taken place.

It should be noted that in the concrete examples which were described above, a description was given of a generator 207 as an alternating signal generator. However, it is possible to conceive of a variant according to which the generator is a simple means of charging the capacitor, controlled so as to charge the capacitor to a constant charge Q. The method then consists of moving the reservoir so as to cause the capacitance to vary, giving rise to a variation in the voltage at its terminals, until the said voltage reaches a predetermined threshold value. Counting the steps of the motor at this time makes it possible to know the distance travelled by the reservoir as previously and, consequently, to know the quantity of consumable product present in the reservoir.

In these examples, excellent effects can be obtained particularly in a recording head and a recording apparatus of a system in which a means (for example, an electro-thermal converting element, laser beam, etc.) for generating thermal energy as energy used in discharging an ink is equipped, and the change of state of the ink is caused to take place by the thermal energy, among the ink-jet recording systems. According to such a system, recording high in density and resolution can be achieved.

With respect to its typical structure and principle, it is preferred to employ the basic principle disclosed in, for example, U.S. Pat. Nos. 4,723,129 and 4,740,796. This system can be applied to both so-called "On-Demand" type and "Continuous" type structures. This system is advantageous to the On-Demand type in particular because an electro-thermal converting element disposed to align to a sheet or a liquid passage in which a liquid (ink) is held is applied with at least one drive signal which corresponds to information to be recorded and which enables the temperature of the electro-thermal converting element to be rapidly raised higher than a nucleate boiling point, so that thermal energy is generated in the electrothermal converting element and film boiling is caused to take place on the surface of the recording head which is heated. As a result, bubbles can be respectively formed in the liquid (ink) in response to the drive signals. Owing to the enlargement and contraction of the bubbles, the liquid (ink) is discharged through the discharging orifice, so that at least one droplet is formed. In a case where the aforesaid drive signal is made to be a pulse signal, a further satisfactory effect can be obtained in that the bubbles can immediately and properly be enlarged/contracted and the liquid (ink) can be discharged while exhibiting excellent responsibility. It is preferable to use a drive signal of the pulse signal type disclosed in U.S. Pat. Nos. 4,463,359 and 4,345,262. Furthermore, in a case where conditions for determining the termperature rise ratio on the aforesaid heating surface disclosed in U.S. Pat. No. 4,313,124 are adopted, a further excellent recording operation can be performed.

In addition to the structure (a linear liquid passage or a perpendicular liquid passage) of the recording head formed by combining the discharging orifice, the liquid passage and the electro-thermal converting element as disclosed in the aforesaid specifications, a structure disclosed in U.S. Pat. Nos. 4,558,333 and 4,459,600 in which the heated portion is disposed in a bent portion is included in the scope of the present invention.

Furthermore, the present invention can effectively be embodied in a structure in which a common slit is made to be the discharge portion of a plurality of electrothermal converting elements and which is disclosed in Japanese Patent Application Laid Open No. 59-123670 and a structure in which an opening for absorbing thermal energy pressure waves is defined to align to the discharge part and which is disclosed in Japanese Patent Application Laid-Open No. 59-138461. Namely, according to the present invention, recording operation can be performed surely and effectively irrespective of the form of the recording head.

The present invention may be applied to a full line type recording head having a length which corresponds to the maximum width of the recording medium, which can be recorded by the recording apparatus.

Such a recording head may be either a structure capable of realizing the aforesaid length and formed by combining a plurality of recording heads or a structure formed by an integrally formed recording head.

In addition, the present invention can also be effectively applied to a recording head fixed to the body of the apparatus, a structure having an interchangeable chip type recording head which can be electrically connected to the body of the apparatus or to which an ink can be supplied from the body of the apparatus when it is mounted on the body of the apparatus, or a cartridge type recording head provided with an ink tank integrally formed to the recording head itself among the above-exemplified serial type recording heads.

It is preferable to additionally provide a recording head recovery means and an auxiliary means of the recording apparatus according to the present invention because the effects of the present invention can further be stabilized. Specifically, an effect can be obtained in that the recording operation can be stably performed by providing a recording head capping means, a cleaning means, a pressurizing or sucking means, an electro-thermal converting element or another heating device or an auxiliary heating means formed by combining the aforesaid elements and by performing a preliminary discharge mode in which a discharge is performed individually from the recording operation.

Although the embodiments of this invention, which have been described above, used the liquid inks, inks which are solid at a temperature lower than room temperature, but are softened or liquefied at room temperature may be used. In the aforesaid ink-jet system, the temperature of an ink is usually controlled in a range from 30° C. to 70° C. so as to adjust the viscosity of the ink within a stable discharge range. Therefore, it is only necessary to use inks which are liquefied in response to a record signal applied. Furthermore, inks, the temperature rise of which is prevented by positively using the temperature rise due to the thermal energy as energy of state change from the solid state to the liquid state of ink or inks which are solidified when it is allowed to stand in order to prevent the evaporation of ink may be used. That is, inks which are liquefied by thermal energy for the first time such as inks liquefied by thermal energy applied in response to the record signal and discharged as ink droplets or inks which already begin to solidify when they reach the recording medium may be employed in the present invention. In this case, an ink may be, in the form of liquid or solid, held by a recess of a porous sheet or a through hole as disclosed in Japanese Patent Application Laid-Open No.54-56847 or 60-71260 and disposed to confront the electro-thermal converting element. It is most preferable for the above-described inks that an ink be discharged by the aforesaid film boiling method.

Furthermore, the ink-jet recording apparatus according to this invention may be in the form, in addition to that used as an image-output terminal for information processing equipment such as a computer, of a copying machine combined with a reader and moreover, of a facsimile terminal equipment having a transmit-receive function or the like.

As has been described above, the present invention can provide ink-jet recording apparatuses, which are cheap and small in size and permit speedy recording of clear and sharp images free from formation of inadequate feathering at boundaries between inks of different colors, without making any changes in constructions of existent apparatuses.

Naturally the present invention is in no way limited to the embodiments described and depicted, but, quite the contrary, encompasses any variant within the reach of persons skilled in the art.

There is claimed:

1. A method for determining a quantity of consumable product present in a reservoir forming part of a movable appliance able to move along a predetermined path, comprising the steps of:

forming a capacitor from two conductive plates situated along the said path so that the path passes through the dielectric space of the capacitor, applying a signal to the capacitor and measuring a resulting signal depending on the capacitance of the capacitor, moving the reservoir along a portion of the path passing through the dielectric space, determining the distance travelled by the reservoir between two positions, a variable position through which the resulting signal passes through a predetermined threshold value and a fixed position, and deducing the quantity of product present in the reservoir as a function of the distance.

2. A method according to claim 1, further comprising the step of placing the reservoir in a predetermined starting position in which it is situated in the dielectric space and then moving it in a direction suitable for reducing the capacitance of the capacitor until the resulting signal reaches the predetermined threshold value and measuring the distance through which the reservoir has been moved at the moment the threshold value is reached in order to deduce therefrom the quantity of product.

3. A method according to claim 2, wherein one of the plates of the capacitor is fixed to a wall of the reservoir, the reservoir and its plate are placed in a position such that the capacitance of the capacitor is at its maximum, and the reservoir is moved until the resulting signal reaches the threshold value.

4. A method according to claim 1 or 2, wherein the two plates are arranged parallel to the direction of movement of the reservoir.

5. A method according to claim 1 or 2, the two plates are arranged perpendicularly to the direction of movement of the reservoir.

6. A method according to claim 1 or 2, wherein the two plates are fixed and arranged parallel to the direction of movement of the reservoir, the reservoir is introduced into the dielectric space in order to place it in an aforesaid predetermined position in which the capacitance of the capacitor is at its maximum, and the reservoir is removed from the dielectric space until the resulting signal reaches the threshold value.

7. A method according to one of the preceding claims 1–3, wherein, the movable appliance being moved by a stepping electric motor, the distance is determined or measured by counting the number of steps of the motor during the travel of the movable appliance between the predetermined positions.

8. A method according to one of the preceding claims 1–3, wherein it is implemented in the vicinity of one end of the aforementioned predetermined path of the movable appliance.

9. A method according to one of the preceding claims 1–3, further comprising the step of displaying an item of information representing the quantity of product remaining in the reservoir.

10. A method according to one of the preceding claims 1–3, wherein said method is used for determining a quantity of ink remaining in a reservoir fixed to a printing head.

11. A device for determining the quantity of consumable product present in a reservoir forming part of a movable appliance made to move along a guide means under the action of a drive means, comprising:
- a capacitor formed by two conductive plates installed along the guide means so that the said reservoir can engage in the dielectric space of this capacitor,
- signal generation means connected so as to apply this signal to said capacitor,
- receiving means for picking up a resulting signal transmitted by said capacitor in response to the signal,
- comparison means for comparing the resulting signal with a predetermined threshold value, these comparison means producing an output signal when the resulting signal reaches the threshold value,
- means for measuring the movement of the movable appliance and means for establishing an item of information representing the quantity of consumable product as a function of a distance travelled by the movable appliance between two positions, a predetermined position and a position in which the threshold value is reached.

12. A device according to claim 11, wherein said capacitor has a fixed plate in the vicinity of the guide means and a movable plate fixed to one wall of said reservoir.

13. A device according to claim 12, wherein the two plates are parallel to said guide means.

14. A device according to claim 12, wherein said two plates are perpendicular to said guide means.

15. A device according to claim 11, wherein said capacitor has two fixed plates along said guide means, parallel to the direction of movement of the reservoir, and in that the dielectric space defined by these two plates is such that the reservoir can be engaged therein during its path along said guide means.

16. A device according to one of claims 11 to 15, wherein said drive means is a stepping electric motor and said means for measuring the movement of the movable appliance include means of counting the steps of this motor.

17. A device according to one of claims 11 to 15, wherein said capacitor is situated or formed in the vicinity of one end of said guide means.

18. A device according to one of claims 11 to 15, further comprising a display for an item of information representing the quantity of consumable product in said reservoir deduced from the number of steps effected by the motor between a predetermined starting position and a position in which said comparison means produce the output signal.

* * * * *

UNITED STATES PATENT AND TRADEMARK OFFICE
CERTIFICATE OF CORRECTION

PATENT NO.  : 6,247,363 B1
DATED       : June 19, 2001
INVENTOR(S) : Marie- Hélène Froger et al.

It is certified that error appears in the above-identified patent and that said Letters Patent is hereby corrected as shown below:

<u>Title page,</u>
Item [75], Inventors, "Marie- Hélàne Froger" should read -- Marie-Hélène Froger --.

<u>Column 2,</u>
Line 19, "he" should read -- the --.

<u>Column 6,</u>
Line 13, "progressive" should read -- progressively --.

<u>Column 8,</u>
Line 66, "FIG. 4" should read -- FIG. 7 --.

<u>Column 9,</u>
Line 32, "reading the" should read -- reading --.

<u>Column 10,</u>
Line 59, "electrothermal" should read -- electro-thermal --.

<u>Column 12,</u>
Line 43, "2," should read -- 2, wherein --; and
Line 61, "it" should read -- said method --.

<u>Column 13,</u>
Line 16, "these" should read -- said --; and
Line 18, "value," should read -- value, and --.

UNITED STATES PATENT AND TRADEMARK OFFICE
CERTIFICATE OF CORRECTION

PATENT NO. : 6,247,363 B1
DATED : June 19, 2001
INVENTOR(S) : Marie- Hélène Froger et al.

It is certified that error appears in the above-identified patent and that said Letters Patent is hereby corrected as shown below:

<u>Column 14,</u>
Line 4, "the" should read -- said --; and
Line 9, "in that" should be deleted.

Signed and Sealed this

Twenty-second Day of October, 2002

*Attest:*

*Attesting Officer*

JAMES E. ROGAN
*Director of the United States Patent and Trademark Office*